United States Patent
Kwak et al.

(10) Patent No.: US 12,387,509 B2
(45) Date of Patent: Aug. 12, 2025

(54) SAMPLE LABELING METHOD USING IMAGE-MATCHING

(71) Applicant: SAUDI ARABIAN OIL COMPANY, Dhahran (SA)

(72) Inventors: Hyung Tae Kwak, Dhahran (SA); Dong Kyu Cha, Dhahran (SA); Moataz Abu AlSaud, Khobar (SA); Muhammad M. Almajid, Qatif (SA); Tareq Ghamdi, Dhahran (SA); Mohammed Abbad, Dhahran (SA); Atul Godbole, Dhahran (SA); Naif J. Alqahtani, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 395 days.

(21) Appl. No.: 18/162,292

(22) Filed: Jan. 31, 2023

(65) Prior Publication Data
US 2024/0257543 A1 Aug. 1, 2024

(51) Int. Cl.
*G06V 20/70* (2022.01)
*G06F 16/583* (2019.01)
(Continued)

(52) U.S. Cl.
CPC ............ *G06V 20/70* (2022.01); *G06F 16/583* (2019.01); *G06V 10/761* (2022.01); *G06V 10/82* (2022.01)

(58) Field of Classification Search
CPC ...... G06V 20/70; G06V 10/761; G06V 10/82; G06F 16/583
See application file for complete search history.

(56) References Cited

U.S. PATENT DOCUMENTS 6,292,608 B1 9/2001 Toh
7,020,307 B2 3/2006 Hinton et al.
(Continued)

FOREIGN PATENT DOCUMENTS

CN 110487794 A 11/2019
CN 115082454 A 9/2022
(Continued)

OTHER PUBLICATIONS

T. Abend et al.; "Line-scan detection system to identify rare earth elements in rocks," 2019 IEEE Sensors; 2019; pp. 1-3 (3 pages).
(Continued)

*Primary Examiner* — David F Dunphy
(74) *Attorney, Agent, or Firm* — Osha Bergman Watanabe & Burton LLP

(57) ABSTRACT

A method and system for labeling and identifying a sample, including a rock core sample, after determining a physical primary label has been compromised is provided. The method includes labeling the sample by placing a physical primary label on the sample or sample container, creating a first rollout image of the sample for a secondary label, and storing the first rollout image in a secondary label digital database with a sample identifier. The method continues for identifying the sample after determining the physical primary label has been compromised by creating a secondary rollout image of the sample and searching the secondary label digital database using the second rollout image to create a plurality of matching scores using a machine learning or deep learning image matching technique. The matching scores are then evaluated to determine an identify of a sample and the sample is re-labelled using a replacement primary label.

20 Claims, 7 Drawing Sheets

(51) Int. Cl.
  *G06V 10/74*  (2022.01)
  *G06V 10/82*  (2022.01)

(56) References Cited

U.S. PATENT DOCUMENTS

| | | | |
|---|---|---|---|
| 2005/0279419 A1* | 12/2005 | Tribble | G09F 3/02 |
| | | | 604/416 |
| 2012/0268606 A1* | 10/2012 | Liu | G06Q 10/06 |
| | | | 348/E7.085 |
| 2014/0089835 A1* | 3/2014 | Evans | G06Q 10/08 |
| | | | 715/771 |
| 2017/0286802 A1 | 10/2017 | Mezghani et al. | |
| 2018/0342073 A1 | 11/2018 | Matsumura et al. | |

FOREIGN PATENT DOCUMENTS

| | | | |
|---|---|---|---|
| GB | 2590674 A | 7/2021 | |
| WO | 2022058912 A1 | 3/2022 | |

OTHER PUBLICATIONS

International Search Report issued for corresponding international patent application No. PCT/PCTUS2024/012022, mailed Apr. 9, 2024 (6 pages).

Written Opinion issued for corresponding international patent application No. PCT/PCTUS2024/012022, mailed Apr. 9, 2024 (11 pages).

Guojian Cheng, et al., "Research on Feasibility of Convolution Neural Networks for Rock Thin Sections Image Retrieval," 2018 2nd IEEE Advanced Information Management Communicates Electronic and Automation Control Conference, 2018 (4 pages).

Magdalena Ladniak, et al., "Search of visually similar microscopic rock images," Comput Geosci, 2015 (10 pages).

Mariusz Mlynarczuk, et al., "The application of the automatic search for visually similar geological layers in a borehole in introscopic camera recordings," Measurement, 2016 (10 pages).

* cited by examiner

SAMPLE LABELING METHOD USING IMAGE-MATCHING

BACKGROUND

In the petroleum industry, hydrocarbons are located in reservoirs far beneath the surface of the Earth. Wells are drilled into these reservoirs to access and produce hydrocarbons. As a wellbore is created beneath the surface of the Earth, rock core samples or rock plug samples are often extracted and brought to the surface for examination. In conventional coring, a cylindrical section of rock is cut and removed from the path of the wellbore by a coring bit. A second coring technique, termed "sidewall coring", may also be used to extract a rock core sample. In sidewall coring, mechanical tools may use hollow rotary drills to cut through the sidewall rock formation producing "rotary sidewall cores". The rock core samples may be analyzed to obtain information relating to hydrocarbon exploration including the composition of rock or the geophysical properties of the formation it was extracted from. Rock core samples may be analyzed at a well site, or taken to a separate location to be analyzed, labeled, and stored for further analysis.

Rock core samples are typically labeled with a handwritten marking using a marker on the sample itself, or a sample container holding one or more rock core samples. The sample container may also include a variety of labeling systems including barcodes, quick response (QR) codes, and handwritten labeling. Accurate and reliable labeling of these samples is imperative, as rock core samples are often recovered and re-evaluated after being stored. A common challenge for labeling these heavy and bulky rock core samples is that the labels used often get damaged or lost during handling. If a sample identify is lost, the rock core sample becomes unusable and a new sample must be extracted, resulting in unnecessary costs and downtime.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relating to a method for labeling and identifying a sample, including a rock core sample, after determining a physical primary label has been compromised is provided. The method includes labeling the sample by placing a physical primary label on the sample or sample container, creating a first rollout image of the sample for a secondary label, and storing the first rollout image in a secondary label digital database with a sample identifier. The method continues for identifying the sample after determining the physical primary label has been compromised by creating a secondary rollout image of the sample and searching the secondary label digital database using the second rollout image to create a plurality of matching scores using a machine learning or deep learning image matching technique. Searching the secondary label digital database using the second rollout image includes comparing the second rollout image to a plurality of first rollout images stored in the secondary label digital database. The matching scores are then evaluated to determine an identify of a sample and the sample is re-labelled using a replacement primary label.

In general, in one aspect, embodiments relate to a system that includes a sample, including a rock core sample, a physical primary label associated with the sample that is used to identify the sample, and a secondary labeling system is provided. The secondary labeling system includes a sample roller configured to rotate the sample about a vertical axis and a line scan camera configured to create a first rollout image and a second rollout image of the sample. The secondary labeling system further includes a control and data acquisition system configured to store the first rollout image in a secondary label digital database with a sample identifier. To identify a sample with a compromised primary label, the control and data acquisition system searches the secondary label digital database using the second rollout image to create a plurality of matching scores with the plurality of first rollout images using a machine learning or deep learning image matching technique. The control and data acquisition system is further configured to evaluate the plurality of matching scores to determine an identity of the sample. The control and data acquisition system is further configured to generate a replacement primary label configured to replace the physical primary label that has been compromised after determining the identity of the sample.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
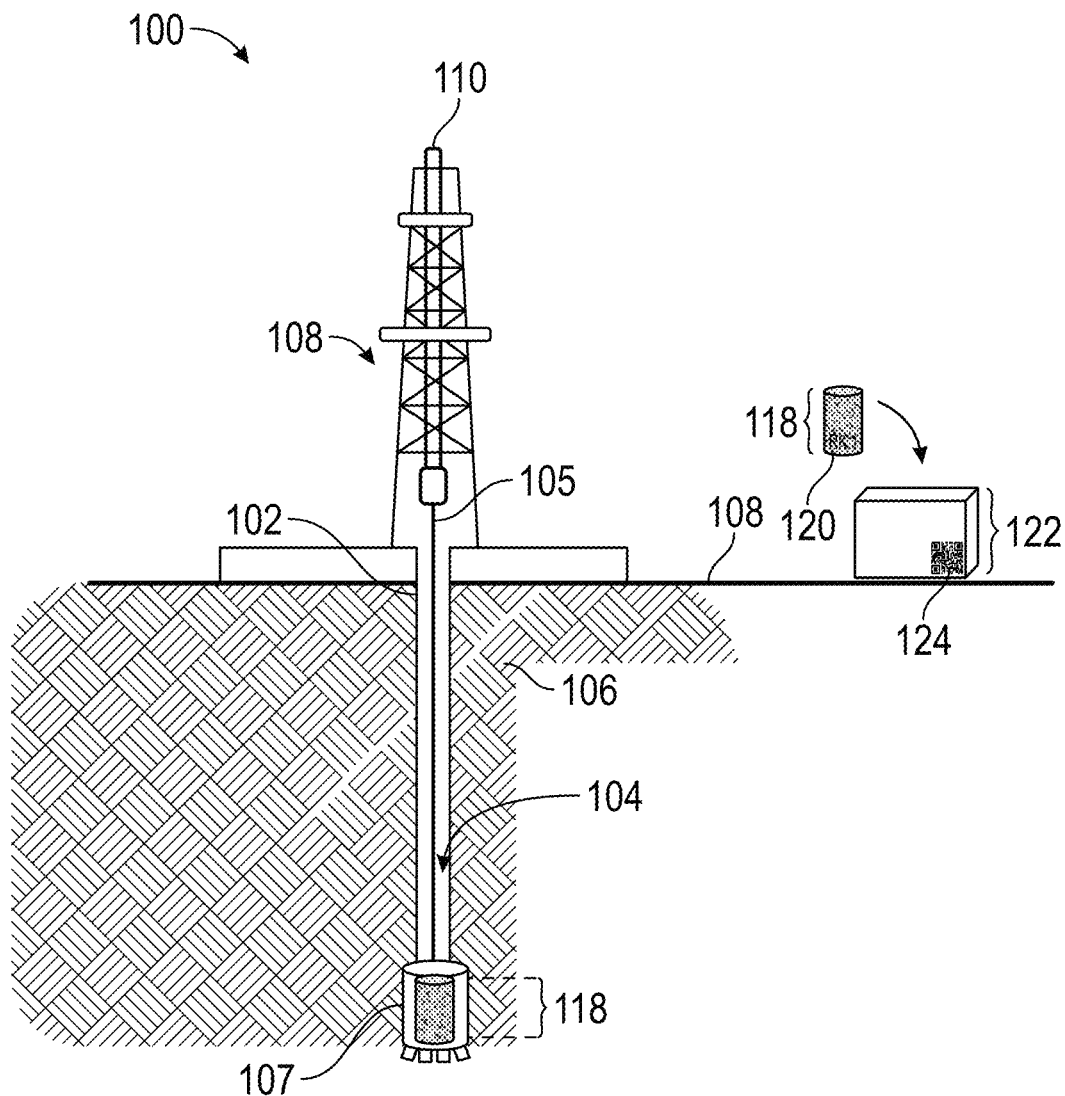
FIG. 1 depicts a well site in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-7 any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein describe methods and systems for labeling and identifying a sample and, in particular, identifying a sample after determining the physical primary label has been comprised. The sample is a rock core sample, cut and removed from the path of a wellbore. Labeling the sample includes placing a physical primary label on the sample. The physical primary label may be physically attached to a sample or a sample container and includes common labeling devices including a barcode, a QR code, radio-frequency identification (RFID) tags, written markings, or a laser engraving. Labeling the sample continues by creating a first rollout image of the sample to be used as a secondary label. The first rollout image is created using a secondary labeling system that includes a sample roller, a line scan camera and a control and data acquisition system. The sample is placed on the sample roller, and the sample is scanned with a line scan camera at a starting sample location. While the line scan camera is actively scanning, the sample is rotated about a vertical axis using the sample roller until the line scan camera returns to the starting sample location. The starting sample location may be any location on a side surface of the sample. Once the first rollout image is created, it is stored in a secondary label digital database with a sample identifier that includes a metadata of the physical primary label and an image acquisition parameter set. Once the physical primary label is attached to the sample, and the first rollout image has been input into the secondary label digital database, the sample may be stored until further needed.

Once the sample is needed for further analysis, the sample is checked in storage for a physical primary label. If the sample has a physical primary label intact, then the sample is identified easily by reading the physical primary label. If it has been determined that the physical primary label has been compromised and the sample is no longer identifiable, the method continues to identify this unknown sample. A second rollout image is created of the sample, using the same methodology as the first rollout image, then the secondary label database is searched using the second rollout image to create a plurality of matching scores using a machine learning or deep learning (ML/DL) image matching technique. In the search, the second rollout image is compared to a plurality of first rollout images stored in the secondary label digital database to create a matching score with each of the plurality of first rollout images. The ML or DL image matching techniques include support vector machines (SVR), bag of features models, Viola-Jones algorithm, Convolutional Neural networks (CNNs), generative adversarial networks (GANs) and region-based CNN (R-CNN). The plurality of matching scores may be a plurality similarity heatmaps which are evaluated to determine the identity of a sample. Once the identity of the sample is determined, the sample is relabeled using a replacement primary label. By creating the secondary label digital database, the risk of losing a samples identity is eliminated or greatly reduced which may significantly reduce potential downtime costs associated with re-acquiring the sample.

FIG. 1 depicts a well site (100) in accordance with one or more embodiments. The well site (100) may include a well (102) having a wellbore (104) extending into a formation (106). The wellbore (104) may include a bored hole that extends from the surface (108) into a target zone of the formation (106), such as a reservoir (not shown). The well site (100) may include a drilling system (108). The drilling system (108) may include a well (102) and a coring bit (107) attached by a drillstring (105) to a coring rig (110). The formation (106) may be cored to produce rock core samples (118) or rock plug sample for analysis. Coring operations may include physically extracting a rock core sample (118) from a region of interest within the wellbore (104) by a coring bit (107) and bring it to Earth's surface (108) to be examined. Rock core samples (118) may also be extracted by sidewall coring, that cuts through the sidewall rock formation producing "rotary sidewall cores" (not shown).

The rock core samples (118), typically cylindrical, may be analyzed on the wellsite (100) or off the well site (100) in a laboratory to determine various characteristics relating to reservoir characterization such as rock composition, porosity, permeability, the presence of hydrocarbons, and other geophysical properties of the cored formation. Porosity may indicate how much void space or pore space exists in a particular rock within the formation (106), where oil, gas or water may be trapped. Permeability may indicate the ability of liquids and gases to flow through the rock within the area of interest. These rock core sample characteristics may aid in determining the potential hydrocarbon productivity of the well.

Many different rock cores samples (118) may be extracted from different depth intervals from one or more wells in a region of interest before analysis. On a drilling operation with multiple nearby wells, hundreds of separate rock core samples (118) may be obtained and stored in the same location. With large quantities of rock core samples (118)

being acquired, accurate labeling of the sample is imperative for identification purposes. Rock core samples (118) are typically labeled with a well number to identify which well the sample was extracted from, a depth to indicate the depth of extraction, and sample number to name and identify the particular sample. may also indicate the depositional orientation of the particular sample, with depositional orientation markings that define the depositional "top" and "bottom" of the sample for that particular depth interval.

Typically, the samples themselves may be labeled using written markings (120) on the rock core sample (118) using a marker. Other important properties of the sample may also be written the rock core sample (118) such as depositional orientation markings (not shown). Having depositional orientation markings on the sample is important for identifying changes in the core characteristics at increasing depths and for identifying the most accurate depth of a particular section of sample. However, labeling that uses written markings (120) on rock core samples (118) may hide some of the unique rock surface characteristics, making an interpretation of the rock core sample (118) more difficult. Once labeled, one or more rock core samples (118) are placed in a sample container (122), to be stored or transported to an offsite location for analysis. A sample container (122) usually includes a segmented carboard or wooden box, that will fit multiple sections of core. On the sample container (122), it is common to also include a label that identifies the rock core sample (118) or samples. These sample containers (122) may include label stickers (124) that contain barcodes, QR codes, handwritten markings or RFID tags.

Once labeled and packed in a sample container (122), the samples may be transported offsite for further analysis or to be put into storage until needed. There are several challenges associated with handling the rock core samples (118) and sample containers (122). The rock core samples (118) are often heavy, and the cylindrical shape enables these samples to roll into other samples inside the sample container (122) or into the surface of the sample container (122) causing damage. The heavy and bulky nature of these rock core samples (118) and sample containers (122) have a high potential to cause damage to or lose the traditional labels (120, 124) when handling. Furthermore, rock core samples (118) when extracted from a well, are often covered in fluids and mud. Handling the samples covered in fluids can become messy and some moisture may remain on the samples when they are labeled and stored. The moisture from the samples may smear written labels (120) rendering them unreadable or weaken the adhesive of any sticker labels (124) causing them to fall off.

If a sample identity is lost, the rock core sample (118) becomes unusable and a new sample will need to be collected if necessary. Re-acquiring rock core samples (118) after a drilling operation has already been completed may be an expensive process resulting in a large amount of non-productive time and unnecessary costs. When a sample label (120, 124) becomes damaged it may become impossible to determine the location of the well it was extracted from, making it impossible to re-acquire a similar rock core sample (118). In some cases, the location of the well may be identified on the label, but other information may be unreadable. In these cases, the well location may be located in a remote area or has already been plugged or closed. In these cases, it will be too costly to reacquire that rock core sample rendering the sample unusable in analysis.

Figure 2B:
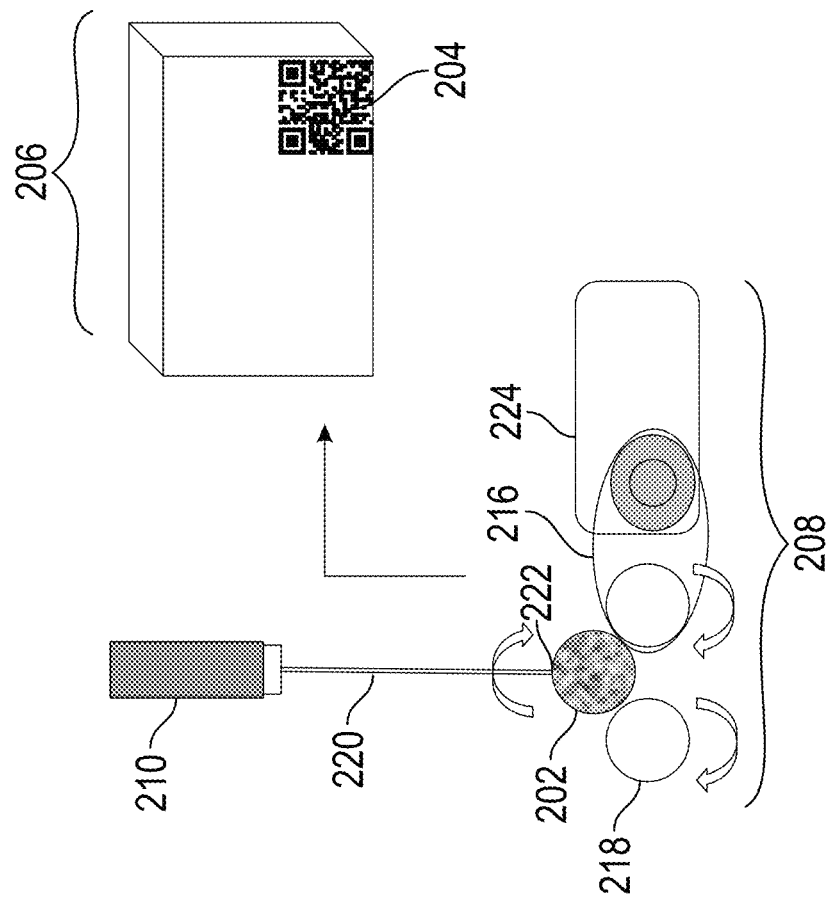
FIGS. 2A-2B depict a system in accordance with one or more embodiments.
Figure 2A:
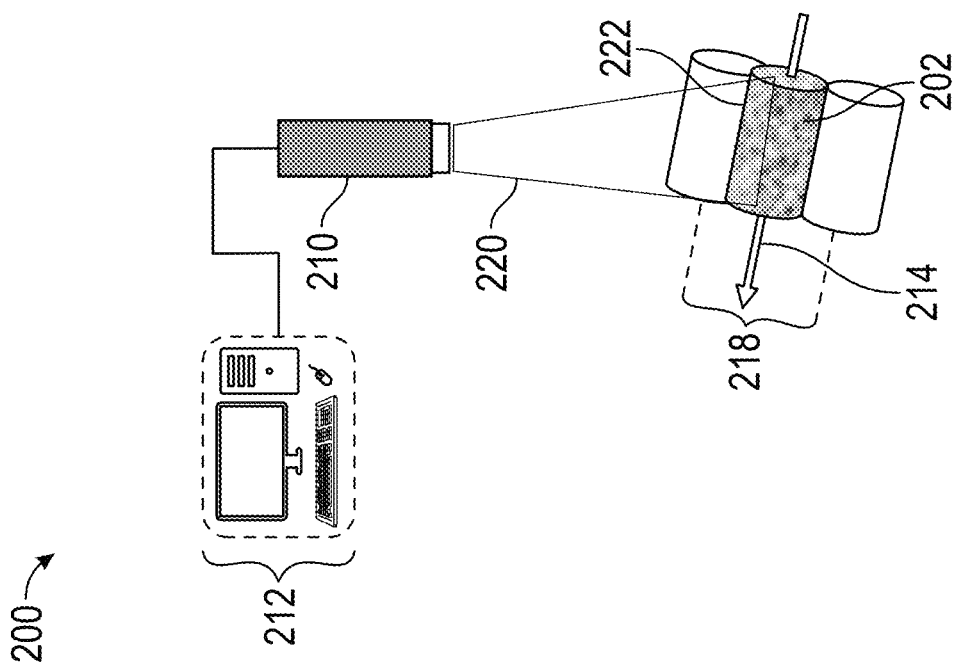

FIGS. 2A and 2B illustrate a system (200) for labeling and identifying a sample (202) in accordance with one or more embodiments. FIGS. 2A and 2B illustrate two different vantage points of the system (200). FIG. 2A shows the system (200) by looking down at the sample (202) and FIG. 2B illustrates a side view of the system (200). Due to the harsh and wet conditions of a well site combined with the challenges of handling heavy samples or sample containers, the traditional labels or physical primary labels (204) used on a sample (202) are often compromised during sample handling. A system (200) has been developed that mitigates the risk of losing a samples identity in the case of a lost physical primary label (204). By mitigating the risk of losing a sample's identity, a fail-free labeling and identification system (200) may significantly reduce potential downtime costs associated with re-acquiring the sample (202). The system (200) includes a sample (202), a physical primary label (204) and a secondary labeling system. In some embodiments, the sample (202) may be a rock core sample, extracted from a subterranean region of interest by coring, as described by FIG. 1. The physical primary label (204) is used to initially label a sample (202) and may be physically attached to a sample container (206) or the sample (202). In some embodiments, the physical primary label (204) may include a barcode, a QR code, RFID tags, written markings, laser engravings or any other form of a physical primary label (204) may be used in the system (200).

In some embodiments, the secondary labeling system includes a sample roller (208), a line scan camera (210) and a control and data acquisition system (212). Once a sample (202) is collected, a physical primary label (204) is physically attached to the sample (202) or sample container (206) as standard practice. The sample (202) is labeled with the physical primary label (204) as soon as possible to avoid mislabeling the sample (202). In some embodiments, the secondary labeling system may be located at the same location as the sample (202) was collected, such as a well site described by FIG. 1. In other embodiments, the sample (202), having the physical primary label (204) attached, is sent to a separate, remote location that houses the secondary labeling system, such as a laboratory. The sample (202) is then removed from any sample container (206) it was transported in and placed on a sample roller (208) directly under a line scan camera (210). The sample (202) is placed with a side surface of the sample facing the line scan camera (210) as illustrated in FIGS. 2A and 2B.

A sample roller (208) is a device that rotates a sample (202) about a vertical axis (214). If the sample (202) is a rock core sample, with depositional orientation markings, a preferred orientation direction may be established prior to placing the sample (202) on a sample roller (208). The sample roller (208) is shown in FIG. 2B having a motor belt (216) or conveyor belt attached to a motor (224) that is connected to one of the two cylindrical rollers (218). When the motor (224) is turned on, the motor belt turns and rotates one of the cylindrical rollers (218), while the other cylindrical roller (218) remains stationary. The sample (202) that is placed in the center of the two cylindrical rollers (218) becomes rotated due to the contact with the rotating cylindrical roller (218).

With the sample (202) placed in the center of the cylindrical rollers (218), a first rollout image of the sample (202) is created using the line scan camera (210) in accordance with one or more embodiments. A line scan camera (210) describes a device capable of producing high resolution two-dimensional (2D) images of a sample (202) using a linear array sensor that sends a single row of light sensitive pixels (220), that captures a single "slice" of the sample (202). The single row of light sensitive pixels (220) continuously scans linear slices of the sample (202), while the sample (202) is rotated about a vertical axis (214) using the sample roller (208). The line scan camera (210) captures multiple "slices" of a sample (202) and these slices may be pieced together to form a rollout image of the sample (202), using the control and data acquisition system (212). The line scan camera (210) begins scanning the sample (202) at a starting sample location (222), which may be any location on a side surface of the sample (202). The starting sample location (222) and the single row of light sensitive pixels (220) is shown in FIG. 2A from the viewpoint of looking down at the sample (202), with the side surface of the sample (202) visible. In FIG. 2A, the full length of the single row of light sensitive pixels (220) is shown to extend the full length of the side surface of the sample (202) covering a single slice of the sample (202). FIG. 2B shows the starting sample location (222) and the single row of light sensitive pixels (220) from a side view, looking directly at a top or bottom surface of the sample (202). From the viewpoint of FIG. 2B, the width of the single row of the light sensitive pixels (220) is shown, which covers the same single slice of the sample (202) as shown in FIG. 2A. The sample (202) illustrating the side surface and the top and bottom surface of the sample (202) is illustrated further in FIG. 3.

The line scan camera (210) continues to scan the sample (202) as it rotates about its vertical axis (214) using the sample roller (208), until the line scan camera (210) with its line sensor (220) returns to the starting sample location. The resulting image is referred to as the first rollout image and is formed by combining the continuous linear arrays captured by the line scan camera (210) using a control and data acquisition system (212) operatively connected to the line scan camera (210). The control and data acquisition system (212) may be a computer system, capable of providing computational functionalities associated with the described processes described in this disclosure and is further discussed in FIG. 7.

The first rollout image is stored in a secondary label digital database, which includes the totality of the rollout images created to label a multitude of samples (202). The first rollout image is related to the sample identity by entering a sample identifier into the secondary label digital database connected with the first rollout image. In some embodiments, the secondary label digital database (not shown) is stored on the control and data acquisition system (212). In other embodiments, one or more components of the control and data acquisition system (212) may be configured to be in communication with one or more separate computing systems (not shown), including cloud-based computing systems that store the secondary label digital database. The sample identifier includes a metadata of the physical primary label in accordance with one or more embodiments and is stored along with the first rollout image in the secondary label digital database. In some embodiments, the sample identifier may also include the parameters used to acquire the first rollout image, referred to as an image acquisition parameter set. In some embodiments, the image acquisition parameter set may include measurements performed to characterize the sample (202) using the line scan camera (210) using a control and data acquisition system (212). In these embodiments, the image acquisition parameter set may include a surface roughness, a contrast of image, a fracture shape and size, bedding and different responses the sample has to varying light sources, including fluorescence light.

Other optional sample specific information may be added to the secondary label digital database without deviating from the scope of the disclosure. Once stored in the secondary label digital database, the sample (202) may be returned to the sample container (206) and stored for later use. The physical primary label (204) should be checked to ensure it remains physically attached to the sample (202) or the sample container (206) prior to storing the sample (202).

The system (200) is further utilized to identify a sample (202) and, in particular, identify a sample (202) that has a compromised physical primary label (204). When the sample (202) is needed in the future, a user would first look to locate the physical primary label (204). If the physical primary label (204) remains intact, then the sample may be easily identified by reading the physical primary label (204). However, if the physical primary label (204) has been compromised to where it is no longer readable, the system (200) may be used to identify the sample (202). Physical primary labels (204) are often damaged or lost in the sample handling process across many different industries, rendering the samples (202) unusable. Rock core samples in particular, extracted from a wet and hostile environment increase the odds of having a compromised physical primary label (204).

To identify a sample (202) with a compromised physical primary label (204) a second rollout image is created using the same method described for the first rollout image in accordance with one or more embodiments. The second rollout image is used to search the secondary label digital database using the second rollout image to determine a match to the first rollout image. In the search, the second rollout image is compared to each one of the plurality of first rollout images stored in the secondary label digital database. The starting sample location (222) used to create the second rollout image does not have to align with the starting sample location (222) used in the first rollout image in accordance with one or more embodiments. When searching the secondary label digital database, using the control and data acquisition system (212), a ML or DL image matching technique may be used that searches the entirety of the secondary label digital database to create a plurality of matching scores with each first rollout image. The plurality of matching scores may be any evaluation of image similarity used by the specific ML or DL image matching technique. The plurality of matching scores may be a plurality of similarity heatmaps in accordance with one or more embodiments. Similarity heatmaps, illustrated further in FIG. 5 visually illustrate a calculated similarity between two images. Each pixel of the second rollout image is compared to the pixel of the first rollout image and given a value that represents the calculated similarity.

In one or more embodiments, the ML or DL image matching techniques are capable of generating multiple matching scores for each of the entries in the secondary label digital database using every possible starting sample location (222). The highest possible matching score for each of the first rollout images found in the secondary label digital database, is kept for evaluation. In some embodiments, the ML or DL image matching techniques includes support vector machines (SVR), bag of features models, Viola-Jones algorithm, Convolutional Neural networks (CNNs), generative adversarial networks (GANs) and region-based CNN (R-CNN). SVMs describe a supervised ML algorithm commonly used in pattern recognition, especially for high-dimensional datasets that require pixel-based image classifiers. An SVM algorithm is configured to accept an unknown image and returns the best estimated image from a database of known images. Bag of features models also referred to as bag of words (BoW) models may be used for image classification or retrieval by treating image features as words (text). To represent an image using bag of features models, an image is treated as a document. The features of the images are turned into "words" which need to be defined. Bag of features models detect multiple features of an image (such as a fracture on a rock core sample), creates a code (or words) for that feature and generates a histogram of the totality of features determined by the model. The histogram of a first rollout image may be compared to the histogram of the second rollout image when using bag of features models for this method.

The Viola-Jones algorithm describes a ML object detection framework and is commonly used in facial detection. It may be adopted for any object detection, including determining a match between a first rollout image and a second rollout image. The Viola-Jones algorithm looks at many smaller subregions of a first rollout image and tries to find a match on the smaller subregion in the secondary label database. CNNs are a subtype of neural networks called deep learning neural networks that are primarily used in image and speech recognition. CNNs may include ML algorithms that may take in an input image, assign importance to various features of the image, and use those features to differentiate from another image. GANs are generative ML models that automatically learn and discover patterns in input data. GANs use two neural networks that compete and feed off the other in order to generate a realistic output. GANs may be used as a generator model to create new images that resembles a training image dataset or used as a discriminator model to identify in an input originates in an original dataset. R-CNNs are a form of CNNs that detect different regions in a single image, extract those regions as defined by characteristic features, and then classification of the extracted features. The extracted features from a first rollout image may be compared to the extracted features from a second rollout image. A neural network is shown and discussed further in FIG. 6.

Any suitable image matching technique known by those skilled in the art may be used, without deviating from the scope of this disclosure. Once the control and data acquisition system (212) has determined a plurality of matching scores, the plurality of matching scores are evaluated to determine an identity of the sample (202). If similarity heatmaps are used to represent the plurality of matching scores, the similarity heatmaps may be inspected visually to determine the closest match, or the control and data acquisition system (212) may represent the similarity heatmap with a single numerical score that averages the similarity score from each pixel of the first rollout image. The first rollout image with the highest numerical score is the determined a match with the second rollout image. A user may predetermine a matching score benchmark, to establish when the highest matching score would be inconclusive. This benchmark score would be dependent on the sample (202). Using a rock core sample as an example, no rock surface image will be exactly identical to a different rock core sample. Similar to a fingerprint, the image of the rock surface is a unique property for each separate rock core sample. Therefore, in the case of a rock core sample, the benchmark matching score for determining a match may be set very high indicating a near perfect match must be established. A rollout image showing a rock's unique surface features is highlighted further in FIG. 3.

Once the sample (202) has been successfully identified, a replacement primary label is created to replace the physical primary label that has been compromised. The replacement primary label (not shown) is then physically attached to the sample (202) or the sample container (206), in the same manner as the original physical primary label was (204). The replacement primary label may include the same types of labels used for the original physical primary label including a barcode, a QR code, RFID tags, a written marking, or a laser engraving. The replacement primary label is used to prevent having to recreate any additional second rollout images, to identify the sample (202) in the future. While the system (200) describes a secondary labeling system capable of identifying samples, it is more time and cost efficient to identify a sample using a physical primary label or the replacement primary label in accordance with one or more embodiments. Although the embodiments disclosed herein focus on the sample (202) being a cylindrical rock core sample, any unique physical sample having any shape that requires labeling may be used by the system (200) without deviating from the scope of this disclosure. In some embodiments, when using a non-cylindrical sample, a user may establish a procedure for selecting a side surface of the sample to be imaged for the first and second rollout images. More specifically, if the sample shape is irregular, the user may select a specific flat surface to register and recognize the sample. Those skilled in the art will readily appreciate that as long as the sample image recognition standard is set, the shape of sample does not matter for the proposed method. The samples (202) used for this system (200) must have unique surface characteristics, producing unique surface images using the line scan camera (210). When a unique surface image is created, they may be used to differentiate from the other potential surface images located in the secondary label database effectively.

Figure 3:
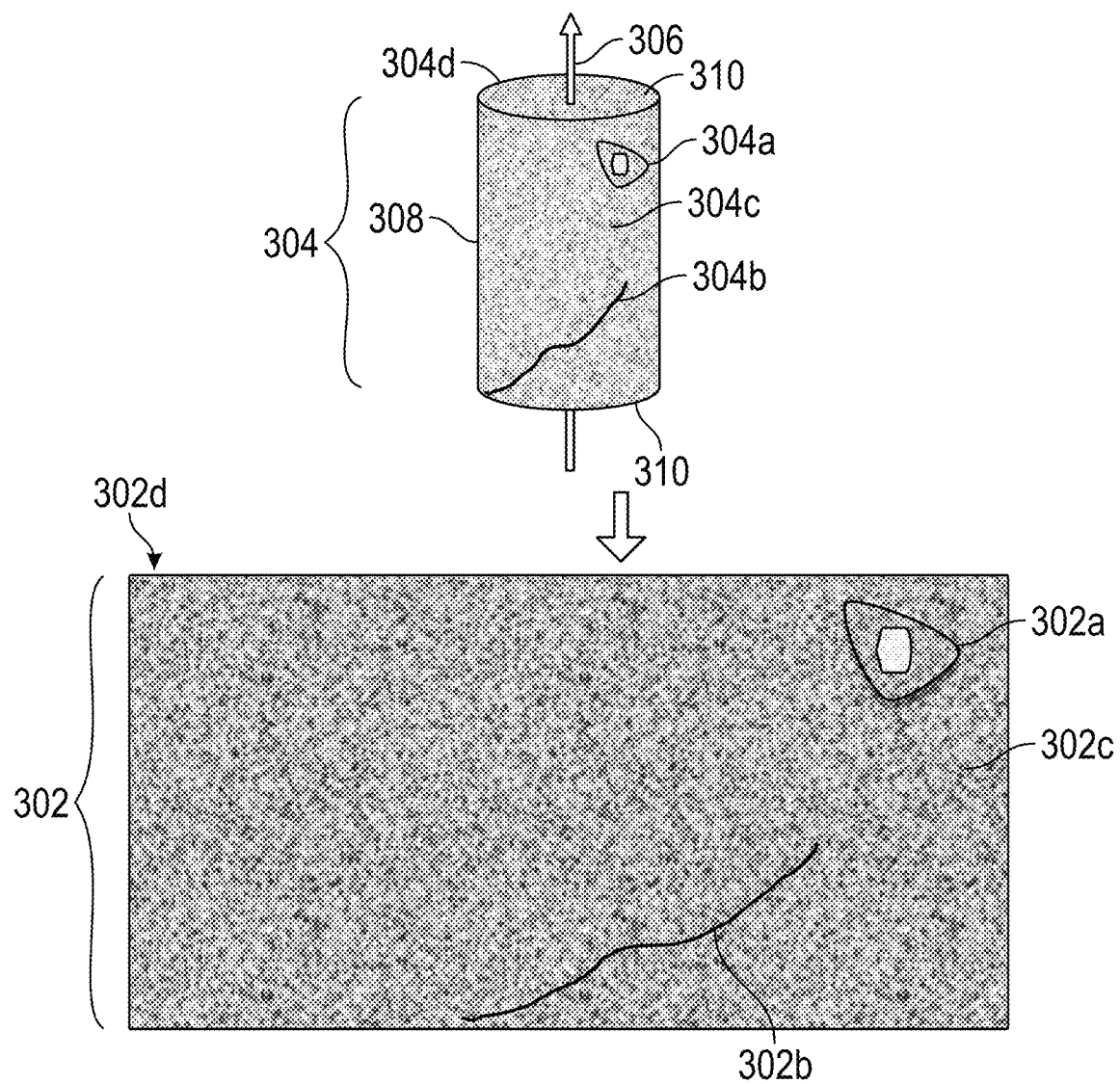
FIG. 3 depicts a rollout image of a sample in accordance with one or more embodiments.

FIG. 3 depicts a rollout image (302) of a sample (304) in accordance with one or more embodiments. FIG. 3 illustrates how a 2D rollout image, created from a 3D cylindrical sample (304) includes unique features that can be used to differentiate the sample (304) from others like it. The sample (304) shown, is a rock core sample, extracted from a subterranean region of interest by coring. The rollout image (302) is acquired using the secondary labeling system described in FIGS. 2A and 2B, which includes placing the sample (304) on a sample roller, with a side surface (308) of the sample directly under a line scan camera and scanning the image as the sample roller rotates the image about a vertical axis (306). The side surface (308), which may also be seen in FIG. 2A, describes the outer cylindrical curved surface of the sample (304). FIG. 3 also shows the top and bottom surface of the sample (304), first shown in FIG. 2B. The vertical axis (306) may be defined by the depositional orientation of the sample (304) in accordance with one or more embodiments. The sample (304) starting sample location (304$d$) is shown in relation to where the starting sample location (302$d$) is located on the rollout image (302). The control and data acquisition system may be configured to shift a starting sample location (302$d$) to produce any number of rollout images (302) from a single sample (304) in accordance with one or more embodiments. This capability ensures that the starting sample location (304$d$, 302$d$) from the first rollout image, does not need to be identical to the starting sample location (304$d$, 302$d$) from the second rollout image in order to compare the images.

Rock core samples (304) contain numerous surface characteristics that may be captured in a rollout image (204) including fractures (302$b$, 304$b$), inclusions, vugs (304$a$, 302$a$), vesicles, fossils and numerous other features that may be used to visually distinguish one rock surface from another. Vugs (304$a$, 302$a$) describe a small cavity or hole in the rock core sample (304) caused by any number of geophysical processes including dissolution or erosion. Fractures (302$b$, 304$b$) describe mechanical breaks in rocks involving discontinuities in displacement across the surface of the rock. Changes in bedding characteristics may also be observed and captured on a rollout image (302), including the presence and characteristics of cross bedding and graded bedding. Cross bedding (not shown) is when a rock layer has a non-horizontal deposition, and the bedding may be seen on a rock core sample (304) inclined to the horizontal. Graded bedding describes when the grain size in the sample (304) gradually changes and may be observed within a single sedimentary layer.

All of these rock surface characteristics are successfully imaged, using the system described in FIGS. 2A and 2B and illustrated by the rollout image (302). These unique characteristics enable the use of image matching techniques to be used in order to match the unique characteristics of a first rollout image to a second rollout image using ML or DL image matching techniques. Conventional labeling that uses written markings on rock core samples (304) may hide some of these unique rock surface characteristics, especially when the markings are smeared during handling.

Although FIG. 3 illustrates and describes using a cylindrical rock core sample, any unique physical sample that requires labeling may be used without deviating from the scope of this disclosure. The samples used for the method disclosed herein must have unique surface characteristics however, producing unique surface images when imaged by the line scan camera. In some embodiments, the first and second rollout images may be captured and stored in color. However, in order to do so, the system must be set up to ensure identical lighting conditions each time a sample is imaged.

Figure 4:
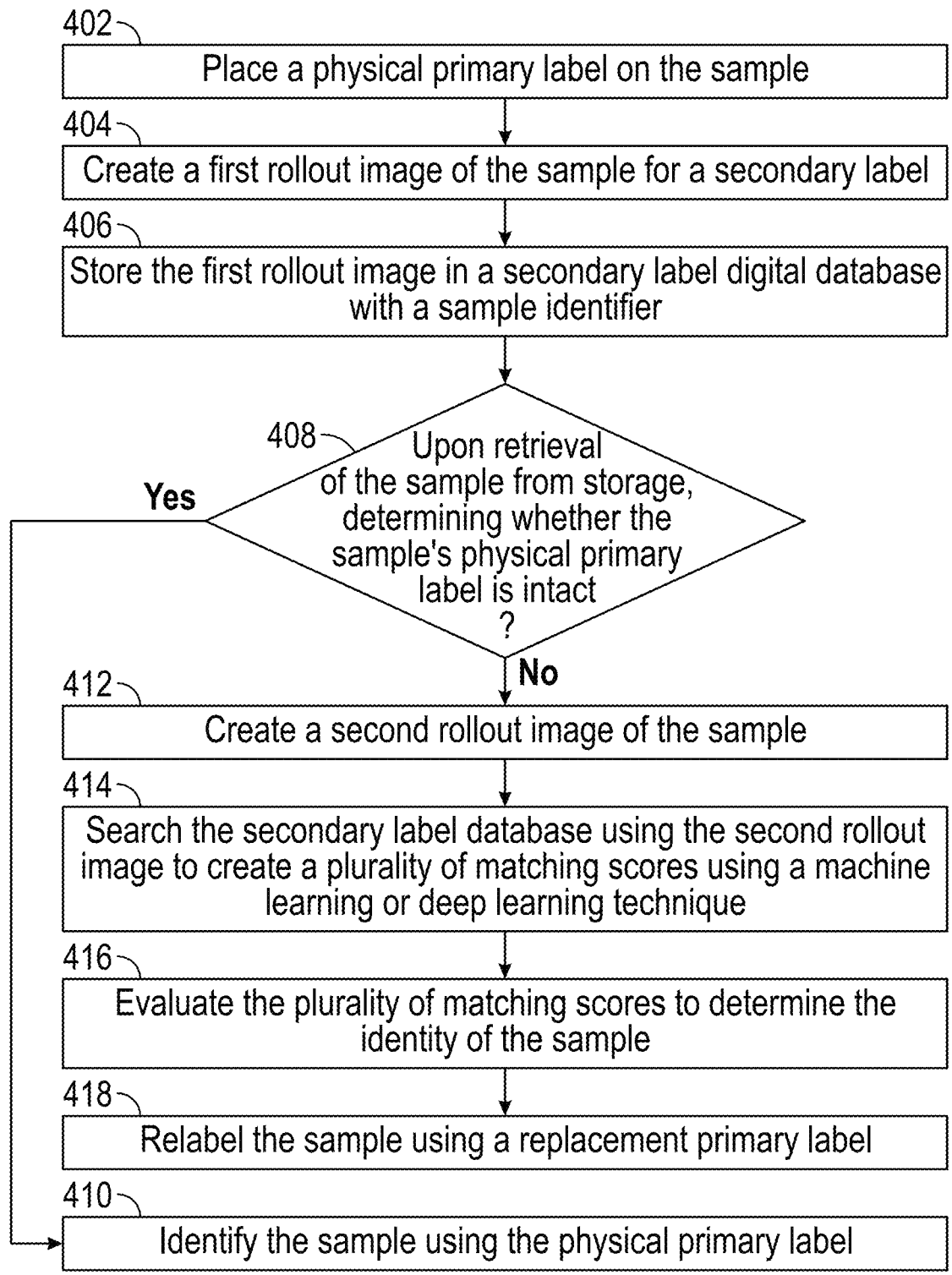
FIG. 4 shows a flowchart in accordance with one or more embodiments.

FIG. 4 shows a flowchart describing the method for labeling and identifying a sample in accordance with one or more embodiments. Steps 402-406 describe labeling the sample and Steps 410-418 describe identifying the sample. The sample may be a rock core sample, extracted from a subterranean region of interest by coring, as described in FIG. 1. More generally, the sample may be any physical object that exhibits a unique surface. In Step 402, a physical primary label is placed on the sample in accordance with one or more embodiments. The physical primary label includes a barcode, a QR code, an RFID tag, a written marking, or a laser engraving. The physical primary label may be physically attached to a sample container or the sample. Step 402 describes a standard labeling practice across many industries; however the risk of damaging or losing the physical primary label is high during handling. The physical primary label may be placed on the sample or sample container at one location, such as a well site and then transported to a separate location that includes a secondary labeling system.

In Step 404, a first rollout image of the sample is created for purposes of generating a secondary label in accordance with one or more embodiments. The first rollout image is created using a secondary labeling system, described in FIGS. 2A and 2B. The secondary labeling system includes a sample roller, a line scan camera and a control and data acquisition system. To create the first rollout image, the sample is first placed on the sample roller. If the sample is a rock core sample, with depositional orientation markings, a preferred orientation direction may be established prior to placing the sample on a sample roller. Using the line scan camera, the sample is then scanned at a starting sample location. The starting sample location may be any location on a side surface of the sample. While the sample is being scanned by the line scan camera, the sample is then rotated about a vertical axis using the sample roller until the line scan camera returns to the starting sample location. The resulting image is a surface image of the sample, referred to as the first rollout image.

In Step 406, the first rollout image is stored in a secondary label digital database with a sample identifier in accordance with one or more embodiments. The first rollout image may be used as a digital 2D representation of the sample surface having the sample identifier function as the digital label. The sample identifier includes a metadata of the physical primary label and an image acquisition parameter set. All of the information included on the physical primary label is to be included with the sample identifier and logged in the secondary label digital database. The image acquisition parameter set may include the parameters used to acquire the first rollout image, including the type of line scan camera used, distance from line scan camera to the sample, or the rotational speed of the sample roller. Other optional sample specific information may be added to the secondary label digital database without deviating from the scope of the disclosure.

Once the first rollout image is saved in the secondary label digital database and the entry is stored with the sample identifier, the sample may now be placed in storage until needed. Often when samples are acquired, including rock core samples, the samples are labeled, analyzed as soon as possible and then stored until further use. Using a rock core sample as an example, it is common to re-examine the samples months or even years after the samples have been collected. When a new exploration well is planned, it may be advantageous to re-examine any rock core samples that are in an area approximate to the planned well site. Multiple rock core samples from areas surrounding the planned well location may be re-examined to determine certain reservoir characteristics pertinent to hydrocarbon exploration. In these cases, being able to accurately identify these samples is imperative to hydrocarbon exploration. A common challenge seen when dealing with large quantities of samples all containing physical primary labels, is that often the physical primary labels become compromised during the handling of the samples. This challenge is exacerbated when dealing with rock core samples that are often heavy, wet, and stored in sample containers composed of cheap materials such as cardboard or thin plywood. Steps 402-406 from above have described the method for labeling a sample in accordance with one or more embodiments. Steps 408-418 describe the method for identifying the sample, that has been labeling according to Steps 402-406 and stored in a storage facility.

In Step 408, the sample is retrieved from storage at some later point in time, when the sample may be needed for analysis, and the sample is checked to see if the physical primary label is intact in accordance with one or more embodiments. Thus, in Step 408, a determination is made as to whether the primary label is useable for purposes of identifying the sample. If the sample still has its physical primary label intact, and the label is readable, then the method continues to Step 410. However, if the physical primary label has been compromised in any way, and there is no readable physical primary label found on the sample or the sample container, then the method continues to Steps 412-418 in accordance with one or more embodiments.

In Step 410, the sample is identified using the physical primary label, and the process ends. Identifying the sample using the physical primary label should be done whenever possible. Using a physical primary label to identify the sample is a standard practice across multiple industries and is the easiest and the least time-consuming technique when applicable. In these standard practices however, if the physical primary label has been compromised by being damaged, missing or simply unreadable, there is no secondary method to identify the sample. In these cases, the samples are rendered unusable and valuable time and money has been wasted acquiring the sample. Using a rock core as the sample, it is often financially unfeasible or impossible to re-acquire an unknown or missing sample. In these cases, the valuable information the rock core samples would provide during analysis is lost indefinitely. The system of FIG. 2 is specifically utilized to identify a sample that has a compromised physical primary label. Steps 412-418 continue the method for identifying a sample with a compromised physical primary label in accordance with one or more embodiments.

In Step 412, a second rollout image of the sample is created in accordance with one or more embodiments. More specifically, a second rollout image is only created when a first rollout image has been previously created and the physical primary label has been compromised according to Step 408. A second rollout image is created using the same technique as the first rollout image described by Step 404 in accordance with one or more embodiments. The unknown sample is placed on the sample roller, the sample is scanned with the line scan camera at a starting sample location, and while scanning the sample, the sample is rotated about a vertical axis using the sample roller until the line scan camera returns to the starting sample location. The starting sample location used to create the second rollout image does not have to align with the starting sample location used in the first rollout image in accordance with one or more embodiments.

In Step 414, the secondary label digital database is searched using the second rollout image to create a plurality of matching scores using a ML/DL image matching technique in accordance with one or more embodiments. Using the control and data acquisition system, the second rollout image is compared to a plurality of first rollout images stored in the secondary label digital database. Any suitable image matching technique known by those skilled in the art may be used, without deviating from the scope of this disclosure. For example, such ML/DL image matching techniques may include SVRs, bag of features models, Viola-Jones algorithm, CNNs, GANs and R-CNNs in accordance with one or more embodiments. The plurality of matching scores may be a plurality of similarity heatmaps in accordance with one or more embodiments. The plurality of matching scores may also be any evaluation of image similarity used by ML or DL image matching techniques. In some embodiments, each pixel of the second rollout image is compared to each pixel of the first rollout image and given a numerical score that represents the similarity between them. The starting sample location for the first rollout image and the second rollout image do not have to be the same due to the nature of the image matching techniques. These techniques are capable of generating multiple matching scores for each entry of the secondary label database. A matching score is determined based on the image similarity and the image is rotated by a vertical pixel row. Now the image matching begins at a new starting sample location and a new matching score is determined. The image may be rotated until every possible starting sample location is represented and given a matching score. The highest matching score for each entry is saved to be compared with the other secondary label database entries.

In Step 416, the plurality of matching scores are evaluated to determine the identity of the sample in accordance with one or more embodiments. At this point, each entry of the secondary label database possesses a single similarity score. These similarity scores representing an image matching score between the first rollout image and the second rollout image are compared and the highest score is selected to identify the sample in accordance with one or more embodiments. The similarity scores may be evaluated manually by a user, or the control and data acquisition system may be configured to automatically select the secondary database entry with the highest score. A matching score benchmark may be established prior to searching the secondary label database, in order to determine when the highest available matching score is inconclusive. Using a rock core sample as an example, no rock surface will be exactly identical to another rock surface image and therefore the matching score benchmark may be set at a high degree of similarity. Rocks contain numerous surface features including fractures, inclusions, vugs, vesicles and numerous others that may be used to visual distinguish one from another. In some embodiments, depending on resolution capabilities of the line scan camera used and the grain size of the rock core sample, a grain size and shape may be used to distinguish between rock surface imagines in accordance with one or more embodiments and by using the ML or DL image matching techniques, a near perfect match may be established giving a high or absolute confidence of the identity of the sample. Once locating the secondary label database entry, the identity of the sample may be found by reading the sample identifier containing a metadata of the physical primary label. The sample identifier may include the location of the well from which the rock core sample was extracted from, the date or extraction, the depth of extraction and any other additional information the user has catalogued into the database.

In Step 418, the sample is relabeled using a replacement primary label after determining the identity of the sample in accordance with one or more embodiments. Once the sample has been successfully identified, a replacement primary label is created to replace the physical primary label that has been compromised. The replacement primary label is then physically attached to the sample or the sample container similarly to the original physical primary. However, by placing the physical primary label on a sample container, no markings on the sample itself is required, preserving the unique rock surface characteristics. The replacement primary label may include the same types of labels used for the original physical primary label including a barcode, a QR code, an RFID tag, a written marking, or a laser engraving. Having an intact physical primary label or replacement primary label is the preferred method of identifying a sample if possible. Simply reading the primary label is more time and energy efficient and should be used first when attempting to identify a sample. In the instances where the physical primary label is unreadable, the method disclosed in the flowchart of FIG. 4 will ensure that a sample will never lose an identity. Many different sample objects across many industries including rock core samples are often very expensive and time consuming to replace. By using the method and system disclosed herein, the risk of downtime cost is greatly reduced or eliminated.

Figures 5A, 5B:
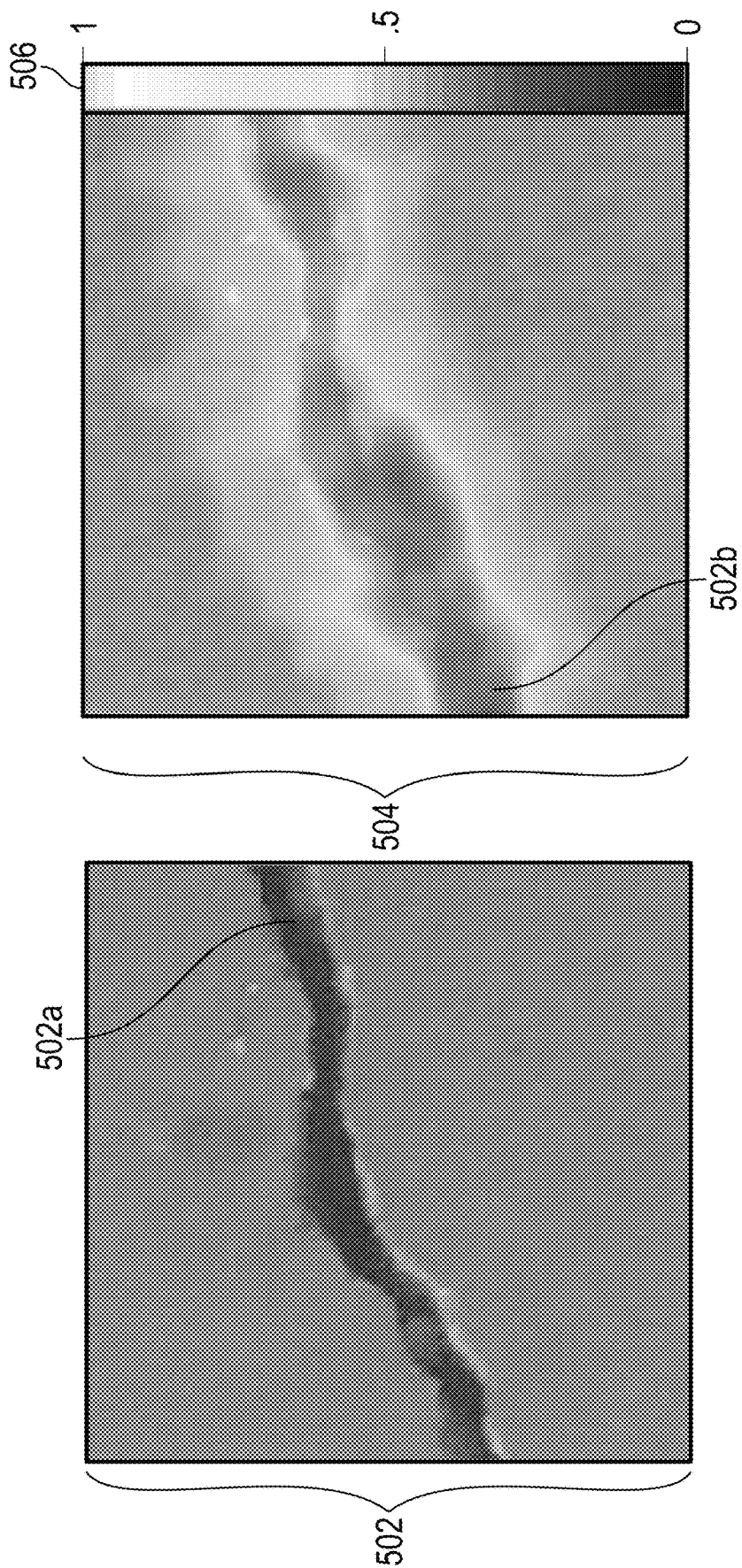
FIGS. 5A and 5B shows a rollout image of a sample and a similarity heatmap in accordance with one or more embodiments.

FIGS. 5A and 5B show a rollout image of a sample and a similarity heatmap in accordance with one or more embodiments. A second rollout image (502) is shown in FIG. 5A and the similarity heatmap (504) is shown in FIG. 5B. The second rollout image (502) has been acquired to identify an unknown sample according to the method disclosed herein and used to search through the secondary label database to find a match with the first rollout image (shown underlaid the similarity heatmap (504)). The images have been zoomed in to show a fracture (502a, 502b), representing a unique surface feature of the second rollout image (502). This fracture (502a, 502b) may also be seen on the rock core sample in FIG. 3. The specific size and shape of the fracture (502a, 502b) is one of the many surface expressions a rock core sample may possess that ensure the surface expression is unique and identifiable. The similarity heatmap (504) shows one of the plurality of matching scores that may be generated by any of the ML or DL image matching techniques described herein. By using the ML and DL image matching techniques, the second rollout image (502) may be compared to the first rollout image generating a matching score.

The matching scores may be visually represented, as it is here on the similarity heatmap (504) with a color scale (506). The color scale (506) illustrates the matching score, or similarity value at each pixel. The matching scores may be on a scale from 1 to 0, with 1 at the top of the color scale (506) indicating an identical match with a white color, and 0 at the bottom of the color scale (506) indicating no similarity with a black color. Each pixel may be evaluated separately, or a group of pixels may be evaluated together depending on the resolution imaging capabilities of the line scan camera and the image matching techniques used. The similarity heatmap (504) may be inspected visually to determine if a match has been found, or the control and data acquisition system may represent the similarity heatmap with a single numerical score that averages the similarity score from each pixel of the first rollout image. When using the similarity heatmap (504) to visually inspect a match between the second rollout image (502) and a first rollout image overlain by the similarity heatmap (504), the fracture (502b) can be seen surrounded by a white color indicating a near identical match to the second rollout image (502). While a similarity heatmap (504) is used as an example in this disclosure, any method used to evaluate an image's likeness or similarity to another image may be used without deviating from the scope of this disclosure.

As discussed, in one or more embodiments, the secondary label database is searched using the second rollout image to create a plurality of matching scores using a ML or DL image matching technique. These techniques, discussed in this disclosure include SVRs, bag of feature models, Viola-Jones algorithm, CNNs, GANs and R-CNNs. These techniques may incorporate machine-learned models, or are, at least in part, composed of machine-learned models. Machine learning (ML), broadly defined, is the extraction of patterns and insights from data. The phrases "artificial intelligence", "machine learning (ML)", "deep learning (DL)", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term ML, or machine-learned, will be adopted herein, however, one skilled in the art will recognize that the concepts and methods detailed hereafter are not limited by this choice of nomenclature.

Machine-learned model types may include, but are not limited to, neural networks, random forests, generalized linear models, and Bayesian regression. Machine-learned model types are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. Commonly, in the literature, the selection of hyperparameter surrounding a model is referred to as selecting the model "architecture". Consequently, in many circumstances, a machine-learned model may be specified by indicating its type and associated hyperparameters.

Figure 6:
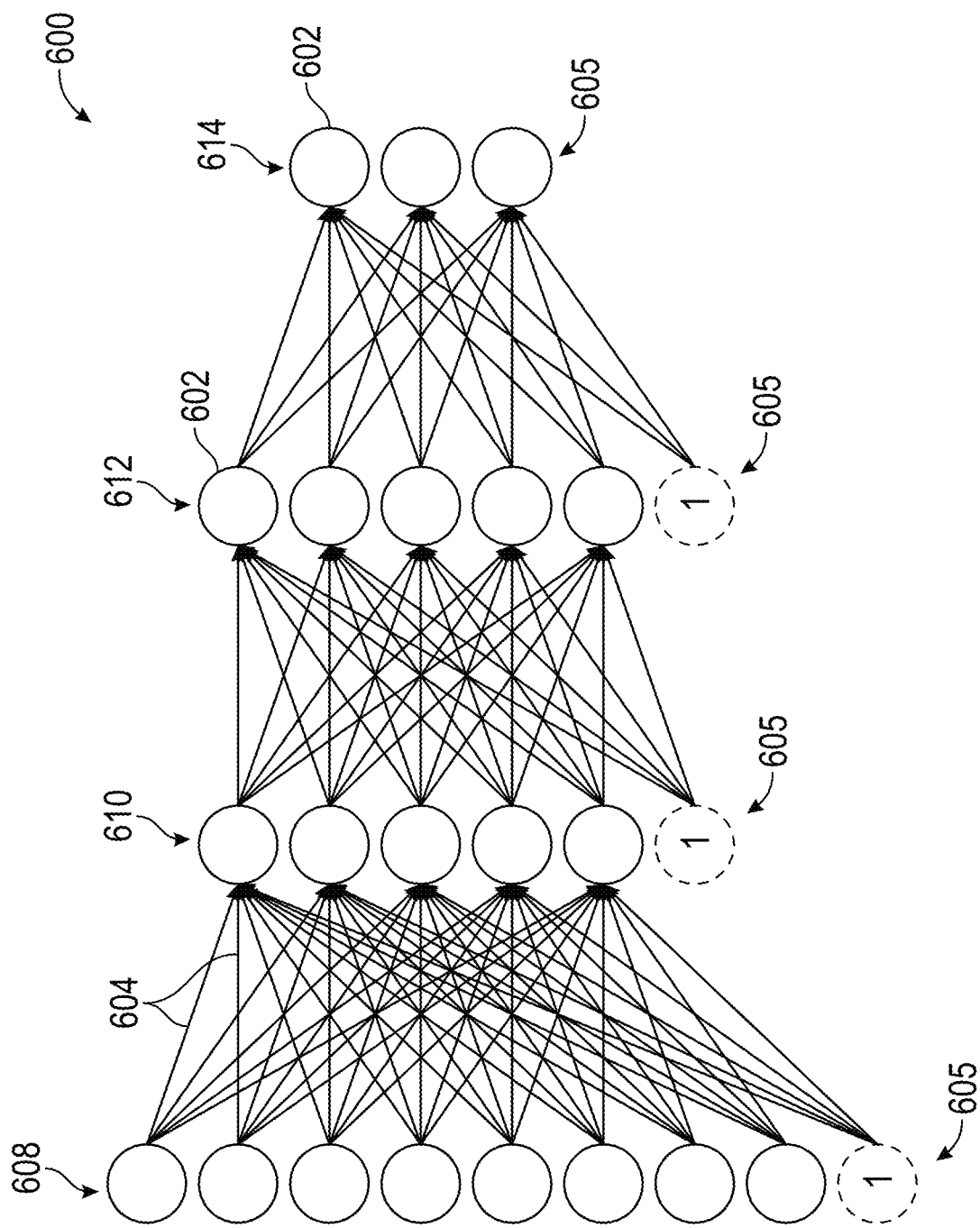
FIG. 6 depicts a neural network, in accordance with one or more embodiments.

Although any ML model may be used in the method described herein to determine a matching score between a first rollout image and a second rollout image, in one or more embodiments, the machine-learned model type may be a neural network. A diagram of a neural network is shown in FIG. 6. At a high level, a neural network (600) may be graphically depicted as being composed of nodes (602), where here any circle represents a node, and edges (604), shown here as directed lines. The nodes (602) may be grouped to form layers (605). FIG. 6 displays four layers (608, 610, 612, 614) of nodes (602) where the nodes (602) are grouped into columns, however, the grouping need not be as shown in FIG. 6. The edges (604) connect the nodes (602). Edges (604) may connect, or not connect, to any node(s) (602) regardless of which layer (605) the node(s) (602) is in. That is, the nodes (602) may be sparsely and residually connected. A neural network (600) will have at least two layers (605), where the first layer (608) is considered the "input layer" and the last layer (614) is the "output layer". Any intermediate layer (610, 612) is usually described as a "hidden layer". A neural network (600) may have zero or more hidden layers (610, 612) and a neural network (600) with at least one hidden layer (610, 612) may be described as a "deep" neural network or as a "deep learning method." In general, a neural network (600) may have more than one node (602) in the output layer (614). In this case the neural network (600) may be referred to as a "multi-target" or "multi-output" network.

Nodes (602) and edges (604) carry additional associations. Namely, every edge is associated with a numerical value. The edge numerical values, or even the edges (604) themselves, are often referred to as "weights" or "parameters". While training a neural network (600), numerical values are assigned to each edge (604). Additionally, every node (602) is associated with a numerical variable and an activation function. Activation functions are not limited to any functional class, but traditionally follow the form $$A = f\left(\sum_{i \in (incoming)} [(\text{node value})_i (\text{edge value})_i]\right),$$

where i is an index that spans the set of "incoming" nodes (602) and edges (604) and f is a user-defined function. Incoming nodes (602) are those that, when viewed as a graph (as in FIG. 6), have directed arrows that point to the node (602) where the numerical value is being computed. Some functions for $f$ may include the linear function $f(x)=x$, sigmoid function $$f(x) = \frac{1}{1+e^{-x}},$$

and rectified linear unit function $f(x)=\max(0, x)$, however, many additional functions are commonly employed. Every node (602) in a neural network (600) may have a different associated activation function. Often, as a shorthand, activation functions are described by the function $f$ by which it is composed. That is, an activation function composed of a linear function ƒ may simply be referred to as a linear activation function without undue ambiguity.

When the neural network (600) receives an input, the input is propagated through the network according to the activation functions and incoming node (602) values and edge (604) values to compute a value for each node (602). That is, the numerical value for each node (602) may change for each received input. Occasionally, nodes (602) are assigned fixed numerical values, such as the value of 1, that are not affected by the input or altered according to edge (604) values and activation functions. Fixed nodes (602) are often referred to as "biases" or "bias nodes" (605), displayed in FIG. 6 with a dashed circle.

In some implementations, the neural network (600) may contain specialized layers (605), such as a normalization layer, or additional connection procedures, like concatenation. One skilled in the art will appreciate that these alterations do not exceed the scope of this disclosure.

As noted, the training procedure for the neural network (600) comprises assigning values to the edges (604). To begin training the edges (604) are assigned initial values. These values may be assigned randomly, assigned according to a prescribed distribution, assigned manually, or by some other assignment mechanism. Once edge (604) values have been initialized, the neural network (600) may act as a function, such that it may receive inputs and produce an output. As such, at least one input is propagated through the neural network (600) to produce an output. Generally, a training dataset is provided the neural network for training. The training dataset is composed of inputs and associated target(s), where the target(s) represent the "ground truth", or the otherwise desired output. The neural network (600) output is compared to the associated input data target(s). The comparison of the neural network (600) output to the target(s) is typically performed by a so-called "loss function"; although other names for this comparison function such as "error function" and "cost function" are commonly employed. Many types of loss functions are available, such as the mean-squared-error function, however, the general characteristic of a loss function is that the loss function provides a numerical evaluation of the similarity between the neural network (600) output and the associated target(s).

In some embodiments, this loss function may be incorporated into determining a numerical evaluation of the similarity between the first rollout image included in the secondary labeling database and the second rollout image that acts as the training dataset composed of numerous "targets". The numerical evaluation may be expressed as a similarity heatmap, illustrated by FIG. 5B.

The loss function may also be constructed to impose additional constraints on the values assumed by the edges (604), for example, by adding a penalty term, which may be physics-based, or a regularization term. Generally, the goal of a training procedure is to alter the edge (604) values to promote similarity between the neural network (600) output and associated target(s) over the data set. Thus, the loss function is used to guide changes made to the edge (604) values, typically through a process called "backpropagation".

While a full review of the backpropagation process exceeds the scope of this disclosure, a brief summary is provided. Backpropagation consists of computing the gradient of the loss function over the edge (604) values. The gradient indicates the direction of change in the edge (604) values that results in the greatest change to the loss function. Because the gradient is local to the current edge (604) values, the edge (604) values are typically updated by a "step" in the direction indicated by the gradient. The step size is often referred to as the "learning rate" and need not remain fixed during the training process. Additionally, the step size and direction may be informed by previously seen edge (604) values or previously computed gradients. Such methods for determining the step direction are usually referred to as "momentum" based methods.

Once the edge (604) values have been updated, or altered from their initial values, through a backpropagation step, the neural network (600) will likely produce different outputs. Thus, the procedure of propagating at least one input through the neural network (600), comparing the neural network (600) output with the associated target(s) with a loss function, computing the gradient of the loss function with respect to the edge (604) values, and updating the edge (604) values with a step guided by the gradient, is repeated until a termination criterion is reached. Common termination criteria are: reaching a fixed number of edge (604) updates, otherwise known as an iteration counter; a diminishing learning rate; noting no appreciable change in the loss function between iterations; reaching a specified performance metric as evaluated on the data or a separate hold-out dataset. Once the termination criterion is satisfied, and the edge (604) values are no longer intended to be altered, the neural network (600) is said to be "trained."

Figure 7:
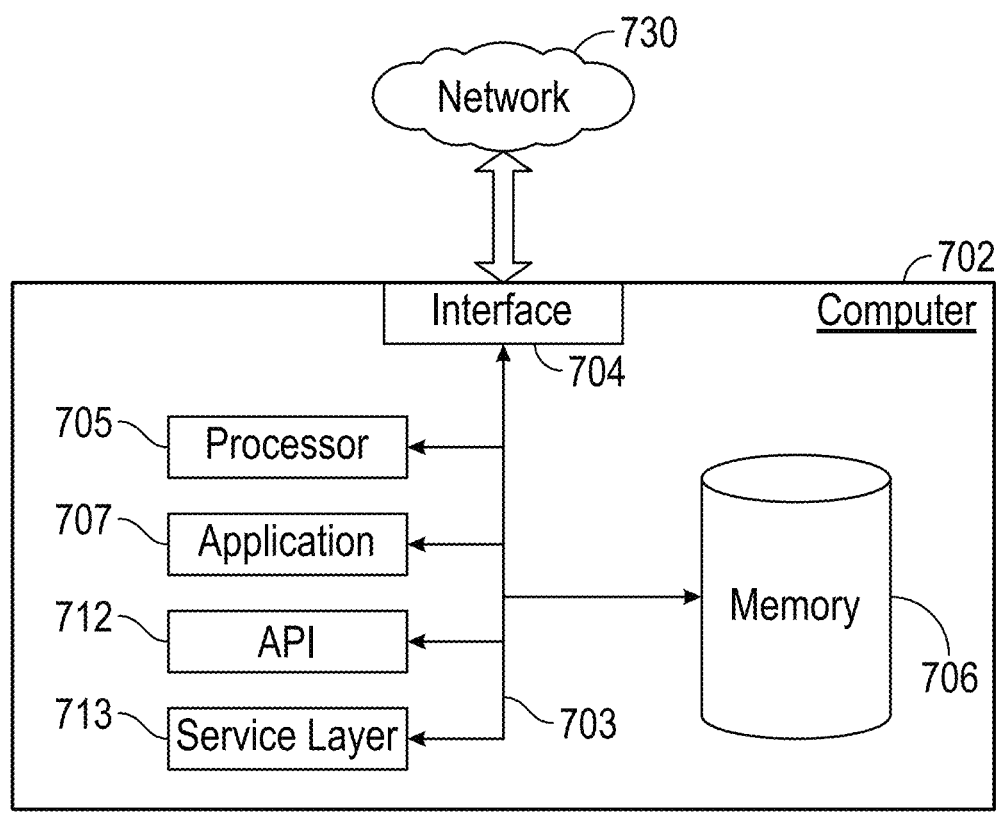
FIG. 7 depicts a computer system in accordance with one or more embodiments.

FIG. 7 depicts a block diagram of a computer system used to provide computational functionalities associated with described algorithms, methods, functions, processes, flows, and procedures as described in this disclosure, according to one or more embodiments. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or another suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), wherein each computer (702) communicates over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

In some embodiments, a control and data acquisition system (212) may describe a first computer (702) and one or more first Applications (707) capable of performing functions related to the sample labeling method as described herein, including storing the first rollout image in the secondary label digital database, searching the secondary label digital database using the second rollout image, and creating a plurality of matching scores using a ML or DL technique. In some embodiments, this first computer (702) and one or more first Applications (707) may perform all of the previously mentioned functions, while in other embodiments at least one of the function may be performed using a second computer (702) and one or more second Applications (707).

Although only a few example embodiments have been described in detail above, those skilled in the art will readily appreciate that many modifications are possible, including dimensions, in the example embodiments without materially departing from this invention. Accordingly, all such modifications are intended to be included within the scope of this disclosure as defined in the following claims.

What is claimed is:

1. A method comprising:
   labeling a sample comprising:
      placing a physical primary label on the sample,
      creating a first rollout image of the sample for a secondary label, and
      storing the first rollout image in a secondary label digital database with a sample identifier; and
   identifying the sample after determining the physical primary label has been compromised, comprising:
      creating a second rollout image of the sample,
      searching the secondary label digital database using the second rollout image to create a plurality of matching scores using a machine learning or deep learning image matching technique, and
      evaluating the plurality of matching scores to determine an identity of the sample.

2. The method of claim 1, further comprising: re-labelling the sample using a replacement primary label after determining the identity of the sample.

3. The method of claim 1, wherein the sample is a rock core sample.

4. The method of claim 1, wherein the sample identifier includes a metadata of the physical primary label and an image acquisition parameter set.

5. The method of claim 1, wherein the physical primary label comprises a barcode, a QR code, radio-frequency identification (RFID) tags, a written marking, or a laser engraving.

6. The method of claim 4, wherein the physical primary label is physically attached to a sample container or the sample.

7. The method of claim 1, wherein creating the first rollout image and the second rollout image comprises:
placing the sample on a sample roller;
scanning the sample with a line scan camera at a starting sample location; and
while scanning the sample:
rotating the sample about a vertical axis using the sample roller until the line scan camera returns to the starting sample location.

8. The method of claim 1, wherein searching the secondary label digital database using the second rollout image comprises comparing the second rollout image to a plurality of first rollout images stored in the secondary label digital database.

9. The method of claim 1, wherein the machine learning image matching technique comprises support vector machines (SVR), bag of features models, Viola-Jones algorithm, Convolutional Neural networks (CNNs), generative adversarial networks (GANs) and region-based CNN (R-CNN).

10. The method of claim 1, wherein the plurality of matching scores is represented as a plurality of similarity heatmaps.

11. A system for labeling and identifying a sample comprising:
the sample;
a physical primary label associated with the sample that is used to identify the sample; and
a secondary labeling system comprising:
a sample roller configured to rotate the sample about a vertical axis,
a line scan camera configured to create a first rollout image and a second rollout image of the sample, and
a control and data acquisition system configured to:
store the first rollout image in a secondary label digital database with a sample identifier,
search the secondary label digital database using the second rollout image to create a plurality of matching scores using a machine learning or deep learning image matching technique, and
evaluate the plurality of matching scores to determine an identity of the sample when the physical primary label has been compromised.

12. The system of claim 11, wherein the control and data acquisition system is further configured to: generate a replacement primary label configured to replace the physical primary label that has been compromised after determining the identity of the sample.

13. The system of claim 11, wherein the sample is a rock core sample.

14. The system of claim 11, wherein the sample identifier includes a metadata of the physical primary label and an image acquisition parameter set.

15. The system of claim 11, wherein the physical primary label comprises a barcode, a QR code, radio-frequency identification (RFID) tags, a written marking, or a laser engraving.

16. The system of claim 14, wherein the physical primary label is physically attached to a sample container or the sample.

17. The system of claim 11, wherein creating the first rollout image and the second rollout image comprises:
placing the sample on a sample roller;
scanning the sample with a line scan camera at a starting sample location; and
while scanning the sample:
rotating the sample about a vertical axis using the sample roller until the line scan camera returns to the starting sample location.

18. The system of claim 11, wherein searching the secondary label digital database using the second rollout image comprises comparing the second rollout image to a plurality of first rollout images stored in the secondary label digital database.

19. The system of claim 11, wherein the machine learning or deep learning image matching technique comprises support vector machines (SVR), bag of features models, Viola-Jones algorithm, Convolutional Neural networks (CNNs), generative adversarial networks (GANs) and region-based CNNs (R-CNN).

20. The system of claim 11, wherein the plurality of matching scores is represented as a plurality of similarity heatmaps.

* * * * *